US012633012B2

(12) United States Patent
Yamada

(10) Patent No.: US 12,633,012 B2
(45) Date of Patent: May 19, 2026

(54) OPHTHALMIC INFORMATION PROCESSING METHOD, OPHTHALMIC APPARATUS, AND STORAGE MEDIUM STORING OPHTHALMIC INFORMATION PROCESSING PROGRAM

(71) Applicant: NIDEK CO., LTD., Gamagori (JP)

(72) Inventor: Yoshiyuki Yamada, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 174 days.

(21) Appl. No.: 18/364,590

(22) Filed: Aug. 3, 2023

(65) Prior Publication Data

US 2023/0377234 A1     Nov. 23, 2023

Related U.S. Application Data

(63) Continuation of application No. PCT/JP2021/044572, filed on Dec. 3, 2021.

(30) Foreign Application Priority Data

Feb. 12, 2021     (JP) ................................. 2021-020413

(51) Int. Cl.
*G06T 11/60*     (2026.01)
*G06T 11/40*     (2006.01)

(52) U.S. Cl.
CPC .............. *G06T 11/60* (2013.01); *G06T 11/40* (2013.01); *G06T 2210/41* (2013.01)

(58) Field of Classification Search
CPC ..... G06T 11/60; G06T 11/40; G06T 2210/41; A61B 3/028; A61B 3/10; A61B 3/12
See application file for complete search history.

(56) References Cited

U.S. PATENT DOCUMENTS 5,214,456 A * 5/1993 Gersten .................. A61B 3/107
351/212
2010/0111373 A1* 5/2010 Chin .................... A61B 3/0025
382/113

(Continued)

FOREIGN PATENT DOCUMENTS

JP     2011-10944 A     1/2011
JP     2012-75640 A     4/2012

(Continued)

OTHER PUBLICATIONS

Tsui, Ching-Kit, et al. "The relationship between macular vessel density and thickness with light sensitivity in myopic eyes." Current Eye Research 44.10 (2019): 1104-1111. (Year: 2019).*

(Continued)

*Primary Examiner* — Kent W Chang
*Assistant Examiner* — Karl Duc Truong
(74) *Attorney, Agent, or Firm* — Oliff PLC

(57) ABSTRACT

An ophthalmic information processing method includes: acquiring first distribution data representing two-dimensional distribution of first measurement data of examinee's eye-tissue; acquiring second distribution data representing two-dimensional distribution of second measurement data of a measurement target different from that of the first measurement data in the examinee's eye tissue, the two-dimensional distribution being related to a region overlapping with that of the first distribution data; generating a first isoline map in which pixels in a closed section enclosed by an isoline are filled with a color or density level in accordance with a value of the first measurement data, the first isoline map representing the first distribution data; generating a wireframe second isoline map in which a closed section enclosed by adjacent isolines are not filled, the second isoline map representing the second distribution data; and (Continued)

generating a superimposed map by superimposing the first isoline map and the second isoline map.

10 Claims, 7 Drawing Sheets

(56)                    References Cited

U.S. PATENT DOCUMENTS

| | | | |
|---|---|---|---|
| 2011/0001929 A1 | 1/2011 | Tawada | |
| 2012/0083667 A1 | 4/2012 | Isogai et al. | |
| 2013/0148081 A1* | 6/2013 | Tanaka | A61B 3/102 |
| | | | 351/206 |
| 2014/0327916 A1 | 11/2014 | Inoue | |
| 2015/0092161 A1 | 4/2015 | Akita | |
| 2015/0168127 A1 | 6/2015 | Takeno et al. | |
| 2017/0069105 A1 | 3/2017 | Kano et al. | |
| 2017/0112377 A1* | 4/2017 | Shiba | G06T 7/60 |
| 2017/0280990 A1* | 10/2017 | Shimizu | A61B 3/103 |
| 2019/0274542 A1 | 9/2019 | Imamura et al. | |
| 2020/0394789 A1 | 12/2020 | Freund et al. | |
| 2021/0093191 A1* | 4/2021 | Onji | A61B 3/0025 |
| 2021/0121246 A1* | 4/2021 | Gudalo | G06F 3/1423 |
| 2021/0378507 A1* | 12/2021 | Wallace | A61B 5/0077 |
| 2023/0071841 A1* | 3/2023 | Ben-Yishai | A61B 1/313 |

FOREIGN PATENT DOCUMENTS

| | | | |
|---|---|---|---|
| JP | 2014-217423 A | 11/2014 |
| JP | 2015-66242 A | 4/2015 |
| JP | 2015-131107 A | 7/2015 |
| JP | 2017-47127 A | 3/2017 |
| JP | 2018-20192 A | 2/2018 |
| JP | 2019-146683 A | 9/2019 |
| JP | 2019-150486 A | 9/2019 |
| JP | 2019-208845 A | 12/2019 |

OTHER PUBLICATIONS

Hollā[3], GÃibor. "Optical coherence tomography angiography in glaucoma: analysis of the vessel densityâvisual field sensitivity relationship." Annals of Translational Medicine 8.18 (2020): 1203. (Year: 2020).*

Pramil, Varsha, Emily S. Levine, and Nadia K. Waheed. "Macular vessel density in diabetic retinopathy patients: how can we accurately measure and what can it tell US ?. " Clinical Ophthalmology (2021): 1517-1527. (Year: 2021).*

Arasaki, Rei, et al. "Association of vessel density with retinal sensitivity in patients with branch retinal artery occlusion." PloS one 20.7 (2025): e0328382. (Year: 2025).*

Feb. 15, 2022 International Search Report issued in International Patent Application No. PCT/JP2021/044572.

* cited by examiner

<LAYER THICKNESS ANALYSIS MAP>  *FIG. 5*
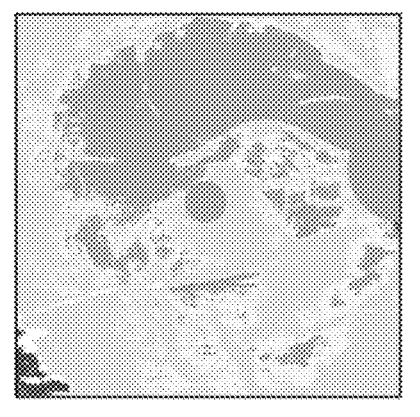
THIN ENTIRETY
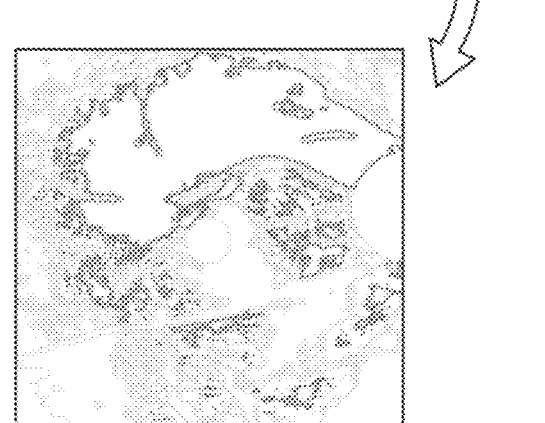
<BLOOD VESSEL ANALYSIS MAP>
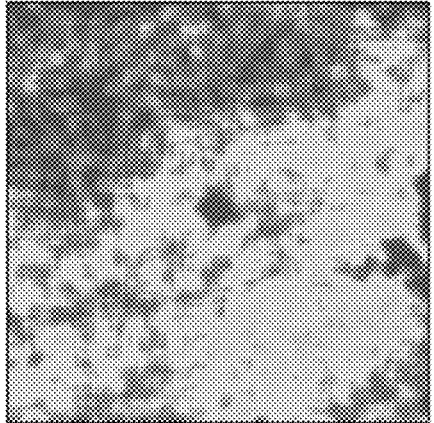
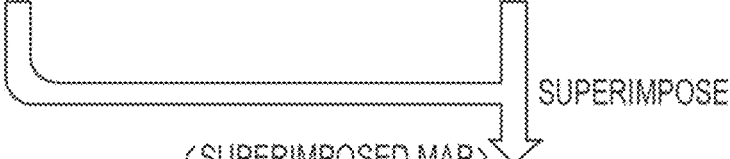
SUPERIMPOSE
<SUPERIMPOSED MAP>
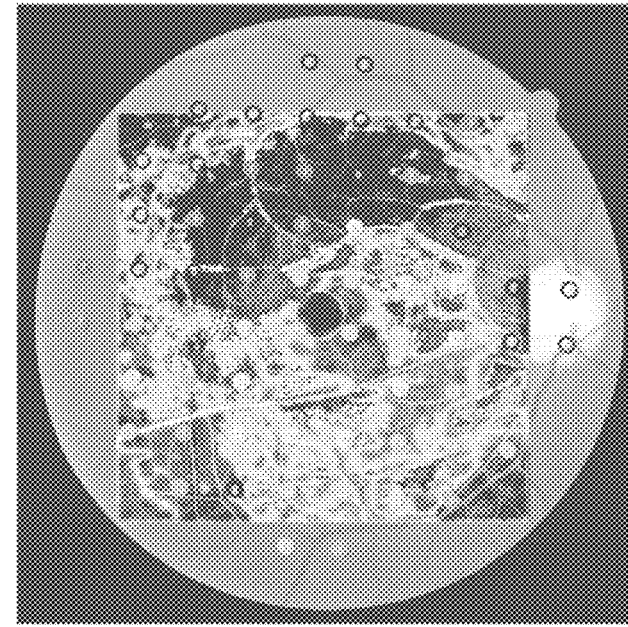

FIG. 6
\<LAYER THICKNESS MAP\>
ADD THREE-DIMENSIONAL EFFECT
\<BLOOD VESSEL MAPS\>
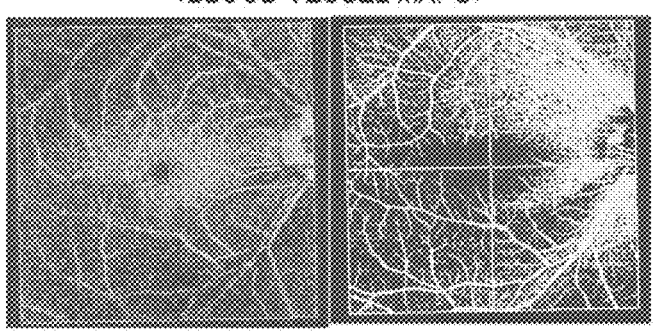
SUPERIMPOSE
\<SUPERIMPOSED MAP\>
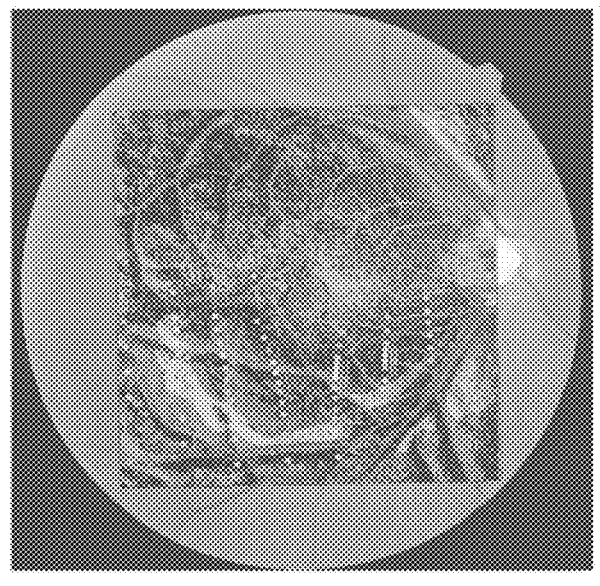

*FIG. 7*
〈LAYER THICKNESS ANALYSIS MAP〉
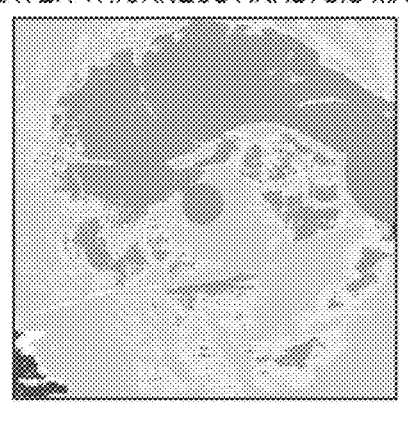
THIN PARTIALLY
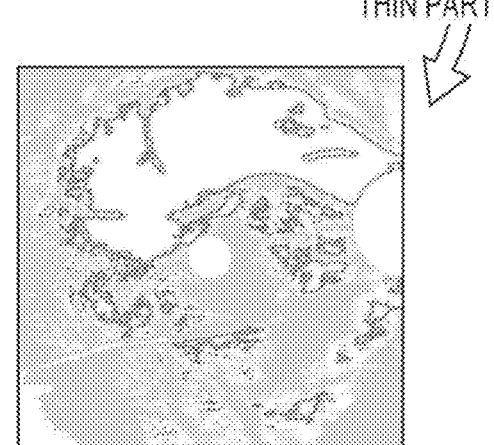
〈BLOOD VESSEL ANALYSIS MAP〉
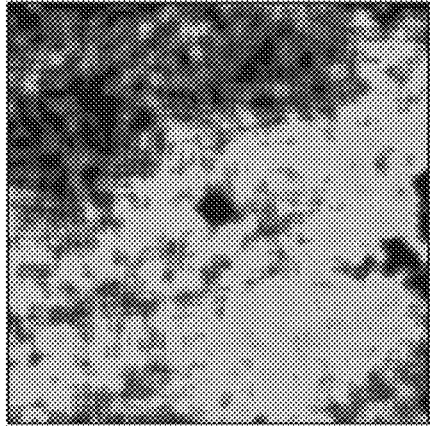
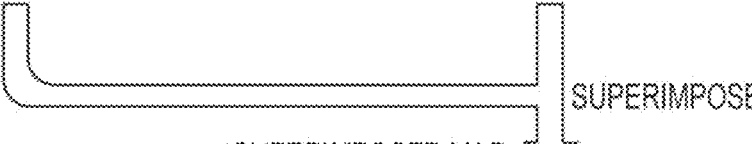
SUPERIMPOSE
〈SUPERIMPOSED MAP〉
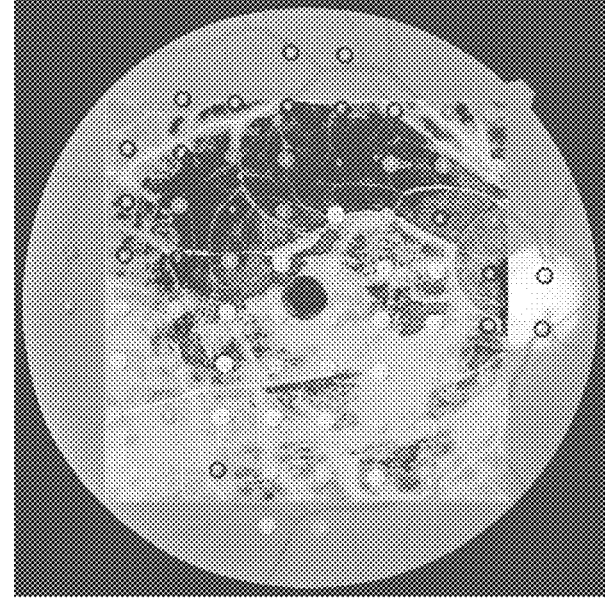

*FIG. 8*
\<LAYER THICKNESS ANALYSIS MAP\>
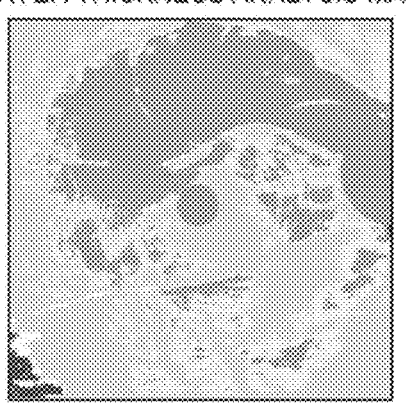
THIN AND HIDE NORMAL LAYER
THICKNESS PORTION
\<BLOOD VESSEL ANALYSIS MAP\>
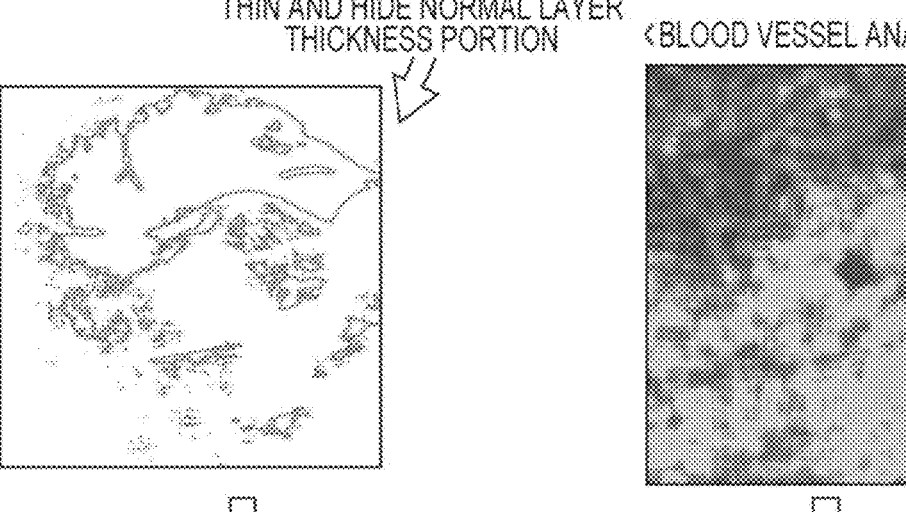
SUPERIMPOSE
\<SUPERIMPOSED MAP\>
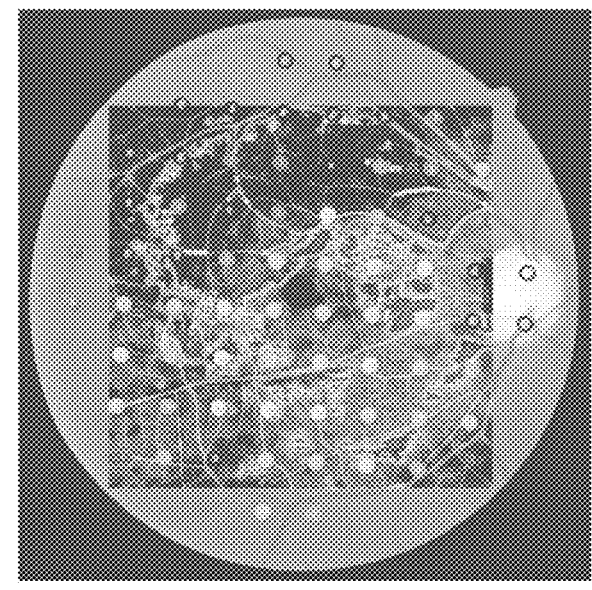

OPHTHALMIC INFORMATION PROCESSING METHOD, OPHTHALMIC APPARATUS, AND STORAGE MEDIUM STORING OPHTHALMIC INFORMATION PROCESSING PROGRAM

CROSS-REFERENCE TO RELATED APPLICATION

The present application is a continuation application of International Application No. PCT/JP2021/044572, filed on Dec. 3, 2021, which claims priority to Japanese Patent Application No. 2021-020413, filed on Feb. 12, 2021. The contents of these applications are incorporated herein by reference in their entirety.

BACKGROUND

1. Technical Field

One aspect of the present disclosure relates to an ophthalmic information processing method, an ophthalmic apparatus, and a storage medium storing the ophthalmic information processing program.

2. Related Art

In the ophthalmic field, a technique for representing and displaying two-dimensional distribution of measurement data of tissue of an examinee's eye as a two-dimensional graph such as a color map is conventionally known.

As an example, various maps (such as a tissue thickness map, and a tissue density map) are used as the two-dimensional graphs in ophthalmic OCT (refer to, for example, JP-A-2017-47127).

SUMMARY

An ophthalmic information processing method to be executed by a processor included in an ophthalmic apparatus, the method including: acquiring first distribution data representing two-dimensional distribution of first measurement data of tissue of an examinee's eye; acquiring second distribution data representing two-dimensional distribution of second measurement data of which a measurement target is different from that of the first measurement data in the tissue of the examinee's eye, the two-dimensional distribution being related to a region overlapping with that of the first distribution data; generating a first isoline map in which pixels in a closed section enclosed by an isoline are filled with a color or density level in accordance with a value of the first measurement data, the first isoline map representing the first distribution data; generating a wireframe second isoline map in which a closed section enclosed by adjacent isolines are not filled, the second isoline map representing the second distribution data; and generating a superimposed map by superimposing the first isoline map and the second isoline map.

BRIEF DESCRIPTION OF THE DRAWINGS

FIG. 1 is a block diagram illustrating an overview of the example.

FIG. 2 is a diagram illustrating an example of an optical system of an OCT device.

FIG. 5 is a diagram for explaining a technique for generating a superimposed map on the basis of a layer thickness analysis map and a blood vessel analysis map.

FIG. 6 is a diagram for explaining a technique for generating a superimposed map in a second embodiment.

FIG. 7 is a diagram for explaining a technique for generating a superimposed map in a first modification.

FIG. 8 is a diagram for explaining a technique for generating a superimposed map in a second modification.

DETAILED DESCRIPTION

Figure 3A:
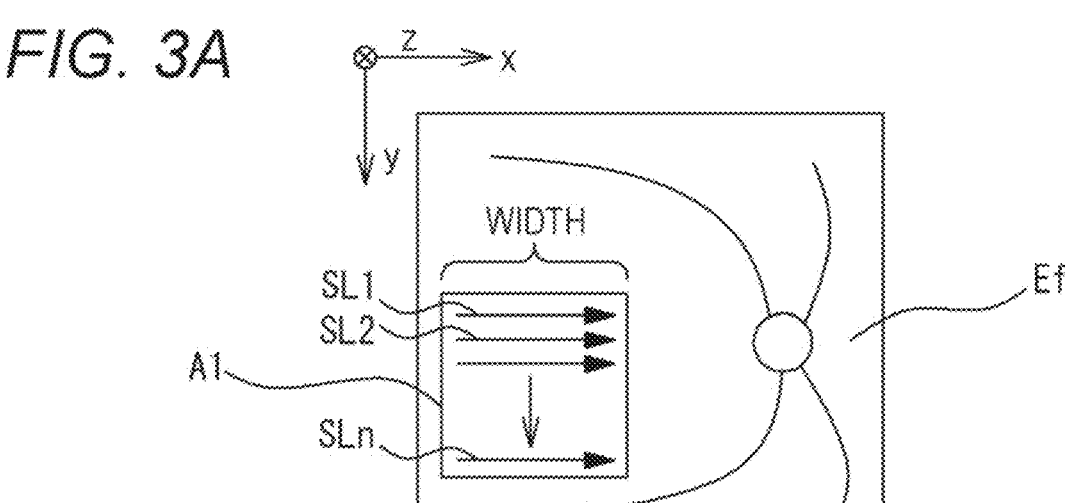
FIGS. 3A, 3B, and 3C are diagrams for explaining the acquisition of motion contrast.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A correlation between a plurality of maps of different kinds is taken. Therefore, it can be expected that an abnormality in each region is checked or predicted. However, making a user intuitively understand a correlation between the maps has not been heretofore studied at a sufficient level. Moreover, it is also difficult with the known technology to make the user understand the distribution of at least one kind of measurement data more intuitively by use of a two-dimensional map.

One object of the present disclosure is to provide an ophthalmic information processing method, an ophthalmic apparatus, and a storage medium storing the ophthalmic information processing program, which make a user intuitively understand the condition of tissue of an examinee's eye.

An ophthalmic information processing program according to a first aspect of the present disclosure causes a processor of an ophthalmic apparatus to execute: a measurement data acquisition step of acquiring first distribution data representing two-dimensional distribution of first measurement data of tissue of an examinee's eye, and second distribution data representing two-dimensional distribution of second measurement data of which measurement target tissue is different from that of the first measurement data, the two-dimensional distribution being related to a region overlapping with that of the first distribution data; and a superimposed map generation step of representing the first distribution data as an isoline map in which pixels in a closed section enclosed by an isoline are filled with a color or density level in accordance with a value of the first measurement data, representing the second distribution data as a wireframe isoline map, and generating a superimposed map in which the two isoline maps are superimposed.

The ophthalmic information processing program according to a second aspect of the present disclosure causes the processor of the ophthalmic apparatus to execute: a layer thickness distribution data acquisition step of acquiring layer thickness distribution data representing two-dimensional distribution of layer thickness information related to fundus tissue of the examinee's eye as the fundus tissue is viewed from the front; and a three-dimensional representation map generation step of generating a three-dimensional representation map that is the two-dimensional distribution of the layer thickness information with a three-dimensional effect by shading in accordance with a value of the layer thickness distribution data.

An ophthalmic apparatus according to a third aspect of the present disclosure executes the above-mentioned ophthalmic information processing program.

An ophthalmic information processing method according to a fourth aspect of the present disclosure to be executed by a processor included in an ophthalmic apparatus, the method including: acquiring first distribution data representing two-dimensional distribution of first measurement data of tissue of an examinee's eye; acquiring second distribution data representing two-dimensional distribution of second measurement data of which a measurement target is different from that of the first measurement data in the tissue of the examinee's eye, the two-dimensional distribution being related to a region overlapping with that of the first distribution data; generating a first isoline map in which pixels in a closed section enclosed by an isoline are filled with a color or density level in accordance with a value of the first measurement data, the first isoline map representing the first distribution data; generating a wireframe second isoline map in which a closed section enclosed by adjacent isolines are not filled, the second isoline map representing the second distribution data; and generating a superimposed map by superimposing the first isoline map and the second isoline map.

An ophthalmic apparatus (this ophthalmic apparatus) according to a fifth aspect of the present disclosure including at least one processor, in which the processor: acquires first distribution data representing two-dimensional distribution of first measurement data of tissue of an examinee's eye; acquires second distribution data representing two-dimensional distribution of second measurement data of which a measurement target is different from that of the first measurement data in the tissue of the examinee's eye, the two-dimensional distribution being related to a region overlapping with that of the first distribution data; generates a first isoline map in which pixels in a closed section enclosed by an isoline are filled with a color or density level in accordance with a value of the first measurement data, the first isoline map representing the first distribution data; generates a wireframe second isoline map in which a closed section enclosed by adjacent isolines are not filled, the second isoline map representing the second distribution data; and generates a superimposed map by superimposing the first isoline map and the second isoline map.

In this ophthalmic apparatus, the first distribution data and the second distribution data may represent distribution of measurement data in a two-dimensional region as the fundus is viewed from the front, and one of the first distribution data or the second distribution data may represent two-dimensional distribution of blood vessel information in fundus tissue of the examinee's eye, and the other may represent two-dimensional distribution of layer thickness information related to the fundus tissue.

In this ophthalmic apparatus, the blood vessel information may be vessel density, and the layer thickness information may be a comparison result between a value of a layer thickness of known normal eye data and an actual measurement value of a layer thickness of the examinee's eye.

In this ophthalmic apparatus, the first isoline map may represent vessel density distribution data as the first distribution data, and pixels in a closed section enclosed by an isoline may be filled with a color or density level in accordance with the vessel density in the first isoline map, and the second isoline map may be a map in a wireframe representation of data of distribution of the comparison results related to the layer thickness as the second distribution data.

In this ophthalmic apparatus, the first distribution data and the second distribution data may include at least information on a retinal surface layer, and the processor may generate the superimposed map of the retinal surface layer as the superimposed map, on the basis of the first distribution data and the second distribution data.

In this ophthalmic apparatus, the processor may further acquire third distribution data being measurement data of the examinee's eye with a static campimeter, the third distribution data representing two-dimensional distribution of visual sensitivities on the fundus, and upon generating the superimposed map, may generate a second superimposed map by further superimposing a visual sensitivity map based on the third distribution data on the superimposed map.

According to a sixth aspect of the present disclosure, a non-transitory, computer-readable, and tangible storage medium stores an ophthalmic information processing program which causes at least one processor of an ophthalmic apparatus to execute: acquiring first distribution data representing two-dimensional distribution of first measurement data of tissue of an examinee's eye; acquiring second distribution data representing two-dimensional distribution of second measurement data of which a measurement target is different from that of the first measurement data in the tissue of the examinee's eye, the two-dimensional distribution being related to a region overlapping with that of the first distribution data; generating a first isoline map in which pixels in a closed section enclosed by an isoline are filled with a color or density level in accordance with a value of the first measurement data, the first isoline map representing the first distribution data; generating a wireframe second isoline map in which a closed section enclosed by adjacent isolines are not filled, the second isoline map representing the second distribution data; and generating a superimposed map by superimposing the first isoline map and the second isoline map.

According to the above aspects of the present disclosure, it is easy to make a user intuitively understand at least one of a correlation between maps or the distribution of measurement data of an examinee's eye.

One embodiment of the present disclosure is described below. A processor of an ophthalmic apparatus executes an ophthalmic information processing program according to the embodiment. Consequently, an ophthalmic information processing method according to the embodiment is implemented to process measurement data of an examinee's eye. The ophthalmic information processing program is an ophthalmic information processing program to be executed by at least one processor of the ophthalmic apparatus, and is stored (recorded) in a non-transitory, computer-readable, and tangible storage medium.

The ophthalmic information processing program is executed by the at least one processor of the ophthalmic apparatus to execute the ophthalmic information processing method including at least a data acquisition step and a superimposed map generation step.

In the data acquisition step, the ophthalmic apparatus acquires first distribution data and second distribution data. The first distribution data represents two-dimensional distribution of first measurement data of tissue of an examinee's eye. The second distribution data is two-dimensional distribution of second measurement data. The second measurement data is different from the first measurement data, in tissue of the examinee's eye targeted for measurement. Moreover, the second distribution data represents the two-dimensional distribution of the second measurement data in a region overlapping with a region corresponding to the first distribution data. In other words, in the examinee's eye, the region corresponding to the first distribution data and the region corresponding to the second distribution data overlap each other (as both two-dimensional distributions are viewed from the front). Note that each kind of the measurement data may be direct measurement values acquired as an eye measurement result. However, each kind of the measurement data is not necessarily limited to direct measurement values, and may be an analysis result that is obtained through an analysis process for direct measurement values.

In the embodiment, two-dimensional graphs of the first distribution data and the second distribution data are generated. Consequently, the first distribution data and the second distribution data can be visualized. The two-dimensional graphs may be isoline maps. In the isoline maps, for example, values of the measurement data are divided into stages on the basis of some thresholds. Lines connecting the measurement data, the lines corresponding to the thresholds, are represented as isolines.

In the superimposed map generation step, a superimposed map is generated. In the superimposed map, an isoline map (a first isoline map) that represents the first distribution data and an isoline map (a second isoline map) that represents the second distribution data are superimposed. In this case, the first distribution data may be represented as an isoline map in which pixels in closed sections enclosed by isolines are filled with the colors or density levels in accordance with the values of the first measurement data. In other words, the first isoline map that represents the first distribution data, in which pixels in closed sections enclosed by isolines are filled with the colors or density levels in accordance with the values of the first measurement data, may be generated. Moreover, the second distribution data may be represented as a wireframe isoline map. In other words, the wireframe second isoline map that represents the second distribution data, in which closed sections enclosed by adjacent isolines are not filled, may be generated. The first isoline map and the second isoline map may be superimposed to generate a superimposed map.

The two isoline maps may be placed in different display layers in such a manner as to overlap with each other to create a superimposed map. At this point in time, the wireframe isoline map indicating the second distribution data is placed in a higher layer than the isoline map indicating the first distribution data.

The second distribution data is represented as the wireframe isoline map. Therefore, it is possible to prevent the second distribution data from making it difficult to see the first distribution data even if the two isoline maps overlap each other. Hence, it is easy for an examiner to visually perceive the first distribution data. Moreover, the isoline map that represents the first distribution data and the isoline map that represents the second distribution data are represented in different forms. Therefore, a user easily grasps the first distribution data and the second distribution data in each region, separately. As a result, for example, it is easy to check the first distribution data and the second distribution data in each region against each other. Therefore, it is easy to find an abnormal location in the two isoline maps that are superimposed and displayed.

Note that in the wireframe isoline map, the closed sections enclosed by the adjacent isolines are not filled. Moreover, the isolines of the wireframe isoline map may be represented, respectively, by lines of the types set according to the values of the measurement data. For example, the line color, pattern, and thickness of each of the isolines may vary according to the value of the measurement data.

Especially, in the embodiment, the distribution of the measurement data in a two-dimensional region as the fundus is viewed from the front may be represented by each of the first distribution data and the second distribution data. Moreover, one of the first distribution data or the second distribution data may represent two-dimensional distribution of blood vessel information in the fundus tissue of the examinee's eye. The other may represent two-dimensional distribution of layer thickness information related to the fundus tissue of the examinee's eye.

Moreover, each of the first distribution data and the second distribution data may indicate the distribution of measurement data of one of a plurality of layers forming the retina, or may indicate the distribution of combined measurement data of some layers.

The blood vessel information may be vessel density information indicating the percentage of blood vessels occupied per unit region (volume or area) (the volume ratio or area ratio, that is, the vessel density). The vessel density information may be density information on all of detected blood vessels, or may be density information on a part of blood vessels such as capillaries. The blood vessel information is not necessarily limited to the above density information, and may be information representing another measurement result such as information related to the dimension of a blood vessel. Moreover, the blood vessel information may be information indicating a time-varying change in any of them.

The two-dimensional distribution related to the blood vessel information may be the two-dimensional distribution of the blood vessel information of one of the plurality of layers forming the retina, or may be two-dimensional distribution of a combination of pieces of the blood vessel information of some layers. The two-dimensional distribution related to the blood vessel information can be acquired by, for example, performing image processing on a fundus image. In an example described below, three-dimensional motion contrast data captured by an OCT apparatus is illustrated by example as the fundus image. However, the fundus image is not necessarily limited to the three-dimensional motion contrast data. The two-dimensional distribution related to the blood vessel information may be acquired on the basis of a front image of the fundus captured by, for example, a fundus camera or SLO. In this case, the front image of the fundus may be angiography, or a reflection image based on red light or infrared light.

The layer thickness information may be, for example, an actual measurement value of a layer thickness of the examinee's eye, or may be a comparison result between the actual measurement value of the layer thickness of the examinee's eye and a layer thickness value of known normal eye data (a statistic of the layer thicknesses from a plurality of normal eyes). The comparison result may be information indicating the degree of a discrepancy between the actual measurement value and the normal eye data, and may be expressed as any of, for example, a difference, a rate, and a deviation. Moreover, the layer thickness information may be information indicating a time-varying change in any of them. Moreover, the layer thickness information may be information indicating the thickness of one of the plurality of layers forming the retina, or may be information indicating the total thickness of some layers.

If, for example, one of the first distribution data or the second distribution data is the two-dimensional distribution of the blood vessel information of the fundus tissue of the examinee's eye, and the other is the two-dimensional distribution of the layer thickness information related to the fundus tissue of the examinee's eye, a superimposed map may be generated for a retinal surface layer. The superimposed map of the retinal surface layer is generated on the basis of the first and second distribution data including information on the retinal surface layer. The term "retinal surface layer" may include at least the nerve fiber layer (NFL) and the ganglion cell layer (GCL). In other words, the first distribution data and the second distribution data may include at least the information on the retinal surface layer. The superimposed map based on the first distribution data and the second distribution data allows the examiner to easily grasp the correlation between a blood vessel distribution and a layer thickness distribution in the retinal surface layer. Glaucoma is generally considered that the layer thickness of the retinal surface layer is reduced due to retinal ganglion cell death, and furthermore, the vessel density of the retinal surface layer is reduced as a secondary change associated with the retinal ganglion cell death. In contrast, it is becoming clear from recent years' studies that a part of circulatory disorders precedes the progression of glaucoma, which is capturing attention. The above superimposed map of the retinal surface layer is expected to allow, for example, easily checking, on one map, a location where a circulatory disorder is occurring prior to a reduction in layer thickness. Therefore, the superimposed map has a possibility of being helpful in not only checking but also predicting the state of glaucoma progression.

Note that when the superimposed map based on the two-dimensional distribution of the blood vessel information of the fundus tissue of the examinee's eye and the two-dimensional distribution of the layer thickness information related to the fundus tissue of the examinee's eye is generated, it is preferable to use an isoline map in which pixels in closed sections enclosed by isolines are filled with the colors or density levels in accordance with the measurement data for the two-dimensional distribution of the blood vessel information, and to use a wireframe isoline map for the two-dimensional distribution of the layer thickness information. In terms of glaucoma, the layer thickness information generally has a wider area that changes on the fundus (especially in the retinal surface layer) than the blood vessel information. Hence, the isoline map representing the two-dimensional distribution of the layer thickness information is likely to be simpler than that of the two-dimensional distribution of the blood vessel information. Therefore, a wireframe representation of the isoline map places less burden on the examiner in terms of interpolating the measurement data of the closed sections enclosed by the isolines in the examiner's head. Hence, the viewability of the superimposed map is unlikely to be damaged. In addition, the examiner can more reliably grasp a location where a circulatory disorder is occurring prior to a reduction in layer thickness by using the isoline map in which the pixels in the closed sections enclosed by the isolines are filled.

It is considered, not only in glaucoma but also in many abnormal fundus cases, that there are many cases having a rich variety of changes in blood vessel as compared to changes in layer thickness. In such cases, it is preferable to use the isoline map in which the pixels in the closed sections enclosed by the isolines are filled with the colors or density levels in accordance with the measurement data for the two-dimensional distribution of the blood vessel information, and to use the wireframe isoline map for the two-dimensional distribution of the layer thickness information.

However, the representations are not limited to the above. For example, in terms of cases in which the change of the layer thickness lags behind the change of the blood vessel, the cases having a rich variety of changes in layer thickness, it is suitable to represent the two-dimensional distribution of the blood vessel information by using a wireframe isoline map whereas representing the two-dimensional distribution of the layer thickness information by using an isoline map in which pixels in closed sections enclosed by isolines are filled.

Moreover, the tissue of the examinee's eye corresponding to the first distribution data and the tissue of the examinee's eye corresponding to the second distribution data may not necessarily agree with each other. The first distribution data and the second distribution data may correspond to regions at different depths, respectively. For example, two regions at different depths in the fundus may correspond to the first distribution data and the second distribution data, respectively. Moreover, two regions at different depths in an eyeball optical system (between the cornea and the fundus) may correspond to the first distribution data and the second distribution data, respectively.

<Use of Measurement Result of Campimeter>

Moreover, in the data acquisition step, the ophthalmic apparatus may further acquire third distribution data. The third distribution data may be measurement data of the examinee's eye with a static campimeter. The static campimeter measures the distribution of sensitivity to a visual stimulation at each point on fundus coordinates. Hence, two-dimensional distribution of visual sensitivities on the fundus is acquired as the third distribution data. The third distribution data indicates, for example, the state of functional disorder progression in an eye with glaucoma. In other words, a CPU 71 may acquire the third distribution data that represents the two-dimensional distribution of the visual sensitivities on the fundus, the third distribution data being measurement data of the examinee's eye with the static campimeter. When subsequently generating a superimposed map (the superimposed map generation step), the CPU 71 may generate a second superimposed map by further superimposing a visual sensitivity map based on the third distribution data on the superimposed map.

In the superimposed map generation step, the second superimposed map may be generated. The second superimposed map is generated by further superimposing the visual sensitivity map based on the third distribution data on the superimposed map. In this case, each of the first distribution data and the second distribution data, on which the superimposed map is based, may be acquired on the basis of a three-dimensional image or front image of the fundus. In other words, the first and second distribution data may be morphologic information. In contrast, the measurement data of the examinee's eye with the static campimeter, which is the third distribution data, is functional information. Therefore, according to the second superimposed map, the condition of the fundus can be grasped from both of morphologic and functional perspectives.

Especially when the first distribution data and the second distribution data are the two-dimensional distribution of the blood vessel information of and the two-dimensional distribution of the layer thickness information of the retinal surface layer, it is possible to check the condition of a functional disorder at each position that is checked on the basis of measurement data of a visual field examination against the blood vessel information and/or the layer thickness information. A part of circulatory disorders precedes the progression of glaucoma. Hence, it is expected that checking the measurement data of the visual field examination against the blood vessel information is helpful in predicting a region in which the functional disorder will progress in the future. Moreover, it is expected that checking the measurement data of the visual field examination against the layer thickness information is helpful in predicting a region in which the functional disorder will progress in the future, or a region in which thinning will progress in the future. It can be expected that the verification of these predictions in a follow-up examination advances the elucidation of the mechanism of glaucoma.

Moreover, the first and second distribution data of the superimposed map may be, for example, a combination of the distribution of the layer thickness information of all the retinal layers and the distribution of the blood vessel information near the RPE layer. In this case, it is useful to spot exudative AMD. In other words, an abnormal area can be easily checked on the basis of a location where angiogenesis is occurring in the RPE layer and layer thickness information of the periphery of the location of angiogenesis. Note that at this point in time, it may be desired to directly check the vessel traveling pattern, rather than the distribution of the blood vessel information, near the RPE layer. In this case, as described below, instead of the two-dimensional distribution of the blood vessel information, a two-dimensional image based on OCT-Angiography may be superimposed on a layer thickness map.

Moreover, the first and second distribution data on the superimposed map may be the distribution of the layer thickness information of all the retinal layers, and the distribution of the blood vessel information of the retinal surface layer. In a case of high myopia, these distributions are considered to be useful in, for example, spotting branch retinal artery occlusion (BRAO) and the like that are difficult to check on a fundus camera image.

Note that in the embodiment, the two-dimensional distribution of the blood vessel information may be used as the distribution data. Instead of this, a two-dimensional image based on OCT-Angiography may be used.

Also in terms of an ophthalmic information processing program according to a second embodiment, a processor of an ophthalmic apparatus executes the program. Consequently, an ophthalmic information processing method according to the second embodiment is implemented to process measurement data of an examinee's eye. This ophthalmic information processing program is also an ophthalmic information processing program to be executed by at least one processor of an ophthalmic apparatus, and is stored (recorded) in a non-transitory, computer-readable, and tangible storage medium. The ophthalmic information processing program is executed by the at least one processor of the ophthalmic apparatus to execute the ophthalmic information processing method including at least a layer thickness distribution data acquisition step and a three-dimensional representation map generation step.

In the layer thickness distribution data acquisition step, layer thickness distribution data representing two-dimensional distribution of layer thickness information related to the fundus tissue of an examinee's eye as the fundus tissue is viewed from the front is acquired by the ophthalmic apparatus. In the three-dimensional representation map generation step, a region in which the value of the layer thickness distribution data decreases progressively in a predetermined one-dimensional direction (a reference direction) is represented with a lower lightness than a region in which the value of the layer thickness distribution data increases progressively in the same reference direction.

Consequently, a three-dimensional representation map that is two-dimensional distribution of layer thickness information having a three-dimensional effect is generated.

According to the ophthalmic information processing program, ophthalmic information processing method, and ophthalmic apparatus of the second embodiment, a three-dimensional effect allows a user to easily realize a change in the value of the layer thickness distribution data as compared to a case of using a map in which at least only one of the color or density level changes according to the value. Hence, it makes it easier for the user to intuitively grasp the distribution of the layer thickness information.

Note that a specific method for generating a three-dimensional representation map on the basis of the layer thickness distribution data can be selected as appropriate. For example, the region in which the value of the layer thickness distribution data decreases progressively in the reference direction may be represented in a darker shade than the region in which the value of the layer thickness distribution data increases progressively in the same reference direction to add a three-dimensional effect to the two-dimensional distribution of the layer thickness information. The reference direction may be, for example, a predetermined one-dimensional direction, or a direction away from a reference point. Moreover, a specific method for shading can also be selected as appropriate. For example, the lightness of a pixel value may be reduced for shading, or a predetermined color may be added for shading. For example, the darkness of a shade (for example, the low lightness) may be proportional to the amount of decrease in the value of the layer thickness distribution data per unit distance (that is, a value decrease rate) in the reference direction. Put another way, the lightness of a shade (the low lightness) of each region may be proportional to the value decrease rate of the layer thickness distribution data in the reference direction for each region. In this case, the three-dimensional effect of the three-dimensional representation map is more recognizable.

Moreover, the three-dimensional representation map may be a map that can be obtained by further adding shading to an isoline map according to the value increase/decrease rate in the reference direction. As described above, in the isoline maps, for example, values of the layer thickness distribution data are divided into stages on the basis of some thresholds. Furthermore, lines connecting the measurement data, the lines corresponding to the thresholds, are represented as isolines. In this case, it is easier for the user to grasp the distribution of the layer thickness information more intuitively due to both of the three-dimensional effect based on shading and the isolines.

Moreover, in the three-dimensional representation map, pixels in closed sections enclosed by the isolines may be filled with the colors or density levels in accordance with the values of the layer thickness distribution data. In this case, it is easier for the user to grasp the distribution of the layer thickness information more intuitively due to the three-dimensional effect based on shading, the isolines, and the color or density level that is added to each of a plurality of the closed sections.

A value of the layer thickness distribution data that is acquired in the layer thickness distribution data acquisition step may be a comparison result between an actual measurement value of the layer thickness and normal eye data (a statistic of the layer thickness from a plurality of normal eyes). The comparison result may be information indicating the degree of a discrepancy between the actual measurement value and the normal eye data, and may be expressed as any of, for example, a difference, a rate, and a deviation. In this case, the degree of the discrepancy between the actual measurement value and the normal eye data is grasped more intuitively due to the three-dimensional effect based on shading. Moreover, the layer thickness information may be information indicating a time-varying change in any of the above difference, rate, and deviation. Moreover, the layer thickness information may be information indicating the thickness of one of a plurality of layers forming the retina, or may be information indicating, for example, the total value of information (thicknesses) of a plurality of layers.

In the ophthalmic information processing program, ophthalmic information processing method, and ophthalmic apparatus according to the second embodiment, a blood vessel distribution data acquisition step and a superimposed map generation step may be further executed. In the blood vessel distribution data acquisition step, blood vessel distribution data representing two-dimensional distribution of blood vessel information of a region of the fundus tissue, the region overlapping with that of the layer thickness distribution data, is acquired. In the superimposed map generation step, the blood vessel distribution data is represented as a blood vessel map in which pixels in closed sections enclosed by isolines are filled with the colors or density levels in accordance with values of the blood vessel distribution data, and a superimposed map in which the three-dimensional representation map and the blood vessel map are superimposed is generated. In this case, the user can appropriately realize a change in the value of the layer thickness distribution data due to the three-dimensional effect after appropriately comparing a positional relationship between the blood vessel information indicated by the blood vessel map and the layer thickness information indicated by the three-dimensional representation map. Hence, the condition of the fundus tissue is grasped more appropriately.

The two-dimensional distribution of the blood vessel information may be two-dimensional distribution of blood vessel information on one of the plurality of layers forming the retina, or may be two-dimensional distribution of blood vessel information between an upper slab (boundary) and a lower slab across a plurality of layers. Moreover, the two-dimensional distribution related to the blood vessel information may be obtained by, for example, performing image processing on a fundus image (three-dimensional motion contrast data captured by an OCT apparatus in an example described below). The blood vessel distribution data may be data indicating, for example, blood flow (blood vessel traveling pattern) in a specific layer in the fundus (for example, a two-dimensional image based on OCT-Angiography). In this case, the user can appropriately realize a change in the value of the layer thickness distribution data due to the three-dimensional effect after appropriately comparing a positional relationship between two-dimensional distribution related to the blood flow and the two-dimensional distribution related to the layer thickness information. Hence, it is easier for the user to judge on various things such as which of the blood flow or the layer thickness greatly affects the disease.

Note that the two-dimensional distribution of the blood vessel information may be displayed three-dimensionally with shading. In this case, the blood vessel information displayed three-dimensionally allows grasping consistency in a positional relationship with another map more easily.

In the ophthalmic information processing program, ophthalmic information processing method, and ophthalmic apparatus according to the second embodiment, a visual sensitivity map superimposition step may be further executed. A visual sensitivity map indicates two-dimensional distribution of a measurement result (visual sensitivity) of the examinee's eye with a static campimeter. In the visual sensitivity map superimposition step, the visual sensitivity map is superimposed on the three-dimensional representation map, or the superimposed map of the three-dimensional representation map and the blood vessel map. In this case, it is easier to grasp the condition of the examinee's eye more appropriately from both perspectives of the geometry of the examinee's eye that is grasped from the three-dimensional representation map, and the function of the examinee's eye that is grasped from the visual sensitivity map.

Figures 1, 2:
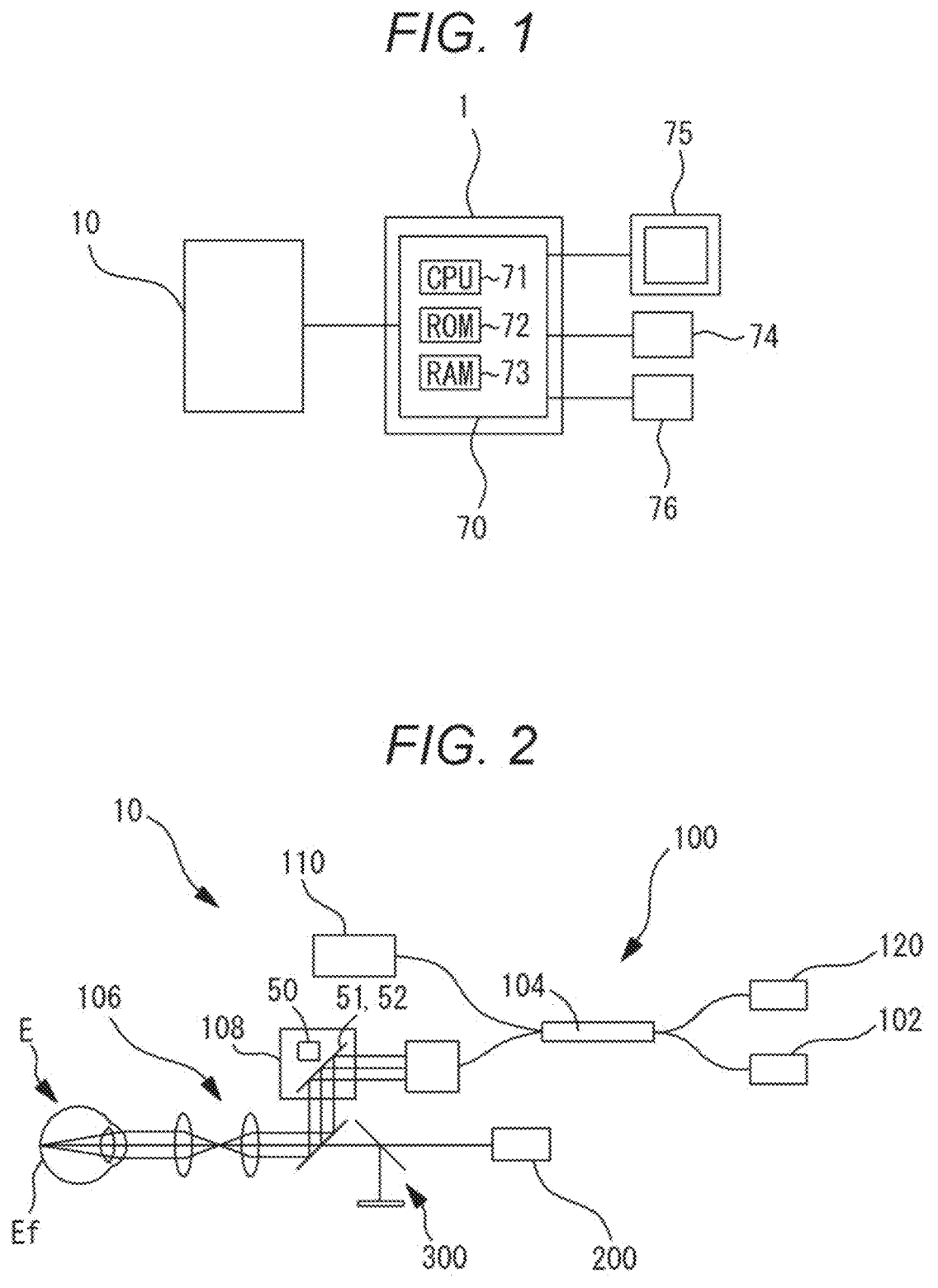

One example of the ophthalmic apparatus, the ophthalmic information processing method, and the ophthalmic information processing program, and a storage medium storing the ophthalmic information processing program is described below with reference to the drawings. Note that an OCT analysis apparatus 1 is described below as an example of the ophthalmic apparatus. The OCT analysis apparatus 1 illustrated in FIG. 1 analyzes and processes OCT data acquired by an OCT device 10.

The OCT analysis apparatus 1 includes, for example, a controller 70. The controller 70 includes, for example, a CPU (Central Processing Unit) 71 being a general processor, a ROM 72, and a RAM 73.

For example, an analysis processing program for processing the OCT data, a program for controlling the operation of the OCT device 10 and obtaining the OCT data, and initial values are stored in the ROM 72. These programs are examples of the ophthalmic information processing program according to the example. These ophthalmic information processing programs that are executed by at least one processor of the ophthalmic apparatus are stored in the ROM 72. The ROM 72 is an example of a non-transitory, computer (for example, the CPU 71)-readable, and tangible storage medium. For example, various kinds of information are temporarily stored in the RAM 73.

As illustrated in FIG. 1, the controller 70 is electrically connected to, for example, a storage unit (for example, non-volatile memory) 74, an operating unit 76, and a display unit 75. The storage unit 74 is, for example, a non-transitory storage medium that can hold stored contents even if the supply of power is interrupted. For example, a hard disk drive, flash memory, and a detachable USB flash drive can be used as the storage unit 74. The ophthalmic information processing program according to the embodiment that is executed by the at least one processor of the ophthalmic apparatus may be stored also in the storage unit 74. The storage unit 74 may also be an example of the non-transitory, computer (for example, the CPU 71)-readable, and tangible storage medium.

The CPU 71 (or the controller 70) of the OCT analysis apparatus 1 executes the ophthalmic information processing program. Consequently, the ophthalmic information processing method according to the example is implemented to process measurement data of an examinee's eye.

Various operation instructions of an examiner are inputted into the operating unit 76. The operating unit 76 outputs, to the CPU 71, a signal in accordance with an operation instruction that has been inputted. A user interface, for example, at least any of a mouse, a joystick, a keyboard, or a touchscreen, can be used as the operating unit 76.

The display unit 75 may be a display mounted on a main unit of the OCT analysis apparatus 1, or may be a display that is connected to the main unit. For example, a display of a personal computer (hereinafter referred to as "PC") may be used as the display unit 75. For example, the OCT data that has been acquired by the OCT device 10, and a result of the analysis process on the OCT data are displayed on the display unit 75.

Note that the OCT analysis apparatus 1 of the example is connected to, for example, the OCT device 10. Note that, for example, the OCT analysis apparatus 1 may be configured in such a manner as to be integral with the OCT device 10, housed in the same housing as the OCT device 10, or may be configured in such a manner as to be separate from the OCT device 10. The controller 70 may acquire the OCT data from the OCT device 10 connected to the OCT analysis apparatus 1. The controller 70 may acquire the OCT data acquired by the OCT device 10, via a storage medium.

<OCT Device>

An overview of the OCT device 10 is described below with reference to FIG. 2. For example, the OCT device 10 irradiates an examinee's eye E with measurement light, and acquires a spectral interference signal of reflected light of the measurement light and reference light. A predetermined process is performed on the spectral interference signal to generate and acquire OCT data. The OCT device 10 mainly includes, for example, an OCT optical system 100.

<OCT Optical System>

The OCT optical system 100 irradiates the examinee's eye E with measurement light, and detects a spectral interference signal of reflected light of the measurement light and reference light. The OCT optical system 100 mainly includes, for example, a measurement light source 102, a coupler (light splitter) 104, a measuring optical system 106, a reference light optical system 110, and a detector 120. Note that refer to, for example, JP-A-2015-131107 for a detailed configuration of the OCT optical system.

The OCT optical system 100 is an optical system of what is called an optical coherence tomograph (OCT: Optical coherence tomography). The OCT optical system 100 causes the coupler 104 to split light emitted from the measurement light source 102 into measurement light (sample light) and reference light. The split measurement light is guided to the measuring optical system 106, and the reference light to the reference light optical system 110. The measurement light is guided to a fundus Ef of the examinee's eye E via the measuring optical system 106. Interference light that is obtained by combining the measurement light reflected by the examinee's eye E and the reference light is then received by the detector 120.

The measuring optical system 106 includes, for example, a scanning unit (for example, an optical scanner) 108. The scanning unit 108 may be provided, for example, to scan over the fundus with the measurement light in an XY direction (transverse direction). For example, the CPU 71 controls the operation of the scanning unit 108 on the basis of scanning position information that has been set. Furthermore, the CPU 71 acquires the OCT data on the basis of the spectral interference signal that has been detected by the detector 120. The reference light optical system 110 generates reference light that is combined with reflected light acquired by the reflection of the measurement light from the fundus Ef. The reference light optical system 110 may be a Michelson system or a Mach-Zehnder system.

The detector 120 detects the state of interference between the measurement light and the reference light. In a case of Fourier domain OCT, the detector 120 detects the spectral intensity of the interference light. Furthermore, the Fourier transformation is applied to spectral intensity data to acquire a depth profile (an A-scan signal) in a predetermined area. Moreover, a scan along one scan line over the fundus Ef by use of the measurement light is referred to as "B-scan."

Two-dimensional OCT data can be obtained in one B-scan. Three-dimensional OCT data can be obtained on the basis of a scan with the measurement light for a plurality of scan lines. The three-dimensional OCT data may be acquired on the basis of, for example, a raster scan.

Note that, for example, spectral-domain OCT (SD-OCT), swept-source OCT (SS-OCT), and time-domain OCT (TD-OCT) may be used as the OCT device 10.

<Front Imaging Optical System>

For example, a front imaging optical system 200 images the fundus Ef of the examinee's eye E in a front direction (for example, an optical axis direction of the measurement light) to obtain a front image of the fundus Ef. The front imaging optical system 200 may have, for example, an apparatus configuration of a scanning laser ophthalmoscope (SLO) (refer to, for example, JP-A-2015-66242), or a configuration of what is called a fundus camera type (refer to JP-A-2011-10944). Note that the OCT optical system 100 may also serve as the front imaging optical system 200, and a front image may be acquired on the basis of a detection signal from the detector 120.

<Fixation Target Projecting Unit>

A fixation target projecting unit 300 includes an optical system for guiding a direction of the visual line of the examinee's eye E. The fixation target projecting unit 300 includes a fixation target that is presented to the examinee's eye E, and can guide the examinee's eye E. For example, the fixation target projecting unit 300 includes a visible light source that emits visible light, and changes the fixation target presenting position two-dimensionally. Consequently, the direction of the visual line is changed, which results in a change in an OCT data acquisition portion.

<Acquisition of Motion Contrast Data>

For example, the OCT analysis apparatus 1 of the example processes the OCT data detected by the OCT device 10 to acquire motion contrast data (hereinafter abbreviated as "MC data"). The MC data may be, for example, information on, for example, captured changes in the blood flow and retinal tissue of the examinee's eye. For example, a change in blood flow is captured to allow the extraction of a blood vessel of the examinee's eye.

An example of a technique for acquiring the MC data is presented. Firstly, the CPU 71 controls the drive of the scanning unit 108 and scans an area A1 on the fundus Ef with the measurement light. Note that in FIG. 3A, a direction of a z-axis is a direction of the optical axis of the measurement light. A direction of an x-axis is perpendicular to the z-axis, and is the right-left direction relative to the examinee. A direction of a y-axis is perpendicular to the z-axis, and is the up-down direction relative to the examinee.

For example, the CPU 71 performs a B-scan along scan lines SL1, SL2, . . . , SLn in the area A1. In this manner, the CPU 71 scans two-dimensionally in the xy direction with the measurement light to acquire an A-scan signal in the z direction at each scan position.

When the MC data is acquired, the CPU 71 acquires at least two sets of OCT data that are different in time, for the same position in the examinee's eye. For example, the CPU 71 performs a plurality of B-scans that are different in time, on each scan line, to acquire a plurality of sets of OCT data that are different in time.

Figure 3B:
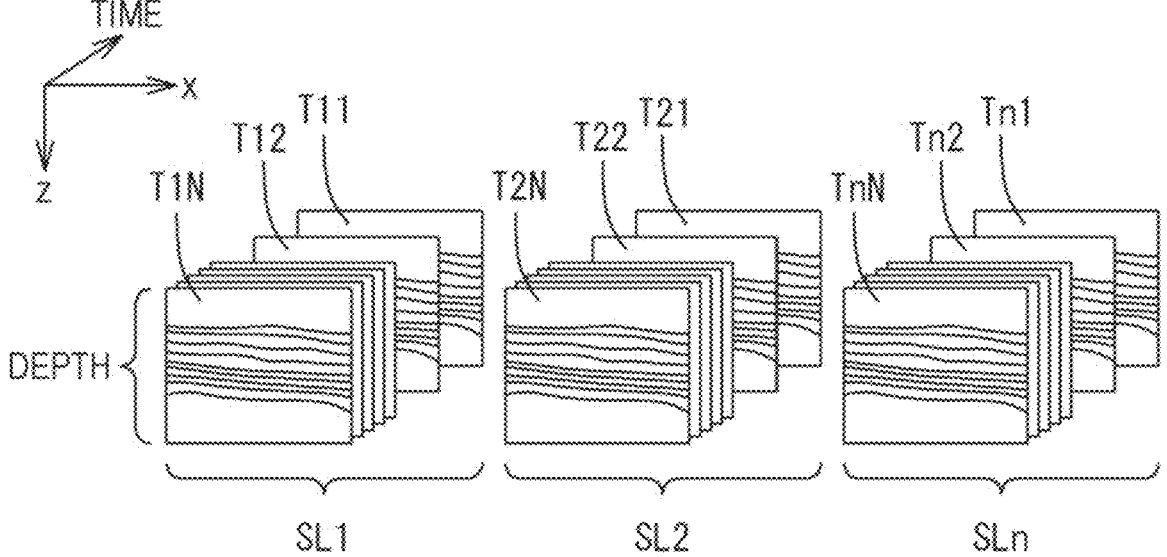
Figure 3C:
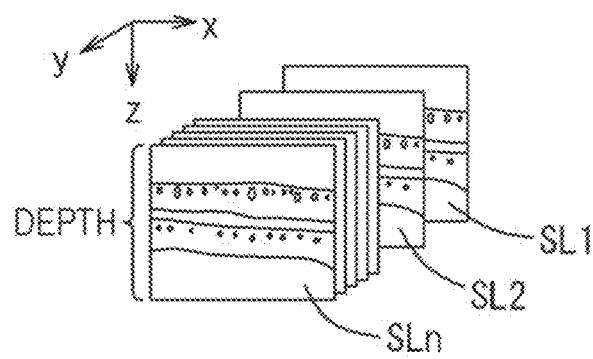

For example, FIG. 3B illustrates OCT data that is acquired when a plurality of B-scans that are different in time is performed on the scan lines SL1, SL2, . . . , SLn. For example, FIG. 3B illustrates OCT data of when the scan line SL1 is scanned at times T11, T12, . . . , T1N, the scan line SL2 at times T21, T22, . . . , T2N, and the scan line SLn at times Tn1, Tn2, . . . , TnN. For example, the CPU 71 acquires a plurality of sets of OCT data that are different in time, on each scan line, and stores these sets of OCT data in the storage unit 74.

After acquiring the plurality of sets of OCT data that are different in time for the same position as described above, the CPU 71 processes the OCT data to acquire MC data. Examples of a method for computing OCT data for acquiring MC data include a method for calculating an intensity difference or amplitude difference of complex OCT data, a method for calculating the variance or standard deviation of the intensity or amplitude of the complex OCT data (Speckle variance), a method for calculating the phase difference or variance of the complex OCT data, a method for calculating a vector difference of the complex OCT data, and a method for multiplying the phase difference and vector difference of a complex OCT signal. Note that refer to, for example, JP-A-2015-131107 for one of the computation techniques.

The CPU 71 may acquire three-dimensional MC data of the examinee's eye E by arranging MC data on different scan lines. Note that as described above, the MC data is not limited to a phase difference, and, for example, an intensity difference or vector difference may be acquired as the MC data.

In the example, a blood vessel area in the MC data may be enhanced (extracted) by image processing.

Figure 4:
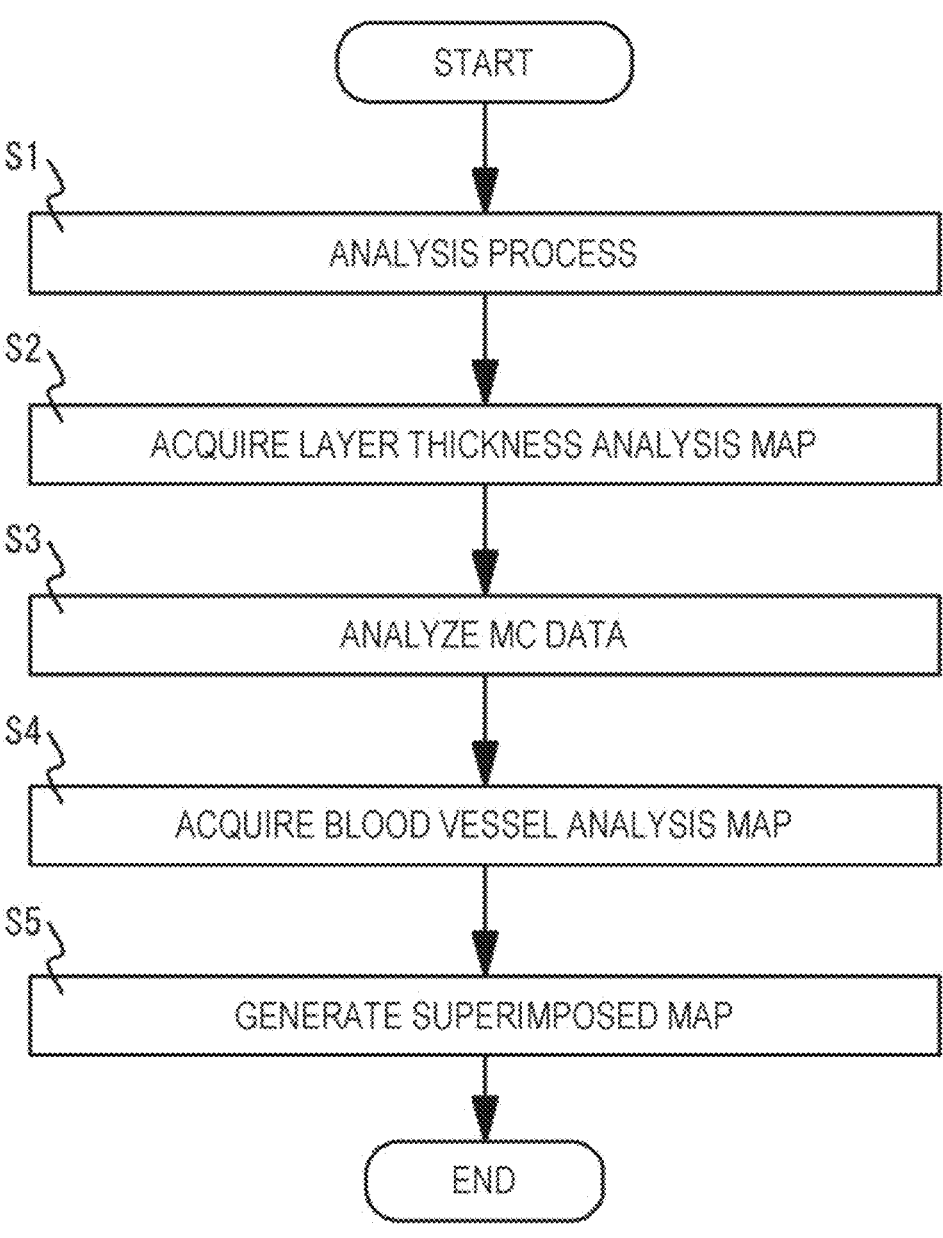
FIG. 4 is a flowchart illustrating the operational flow of an apparatus of the example.

Next, a description is given of various analysis maps that are generated by the OCT analysis apparatus 1 of the example with reference to FIGS. 4 and 5.

The CPU 71 performs an analysis process on the OCT data and the MC data.

<Analysis Process Related to Layer Thickness>

For example, the CPU 71 may perform an analysis related to the layer thickness, on the OCT data. In this case, the CPU 71 may perform a segmentation process to detect layer information from the OCT data, and then acquire layer thickness information of the retinal layers of the examinee's eye. The layer thickness information is measurement data obtained by targeting the layer thickness for measurement. The layer thickness information may be, for example, an actual measurement value of the layer thickness, or information indicating a comparison result between the actual measurement value and normal eye data (a statistic of the layer thickness from a plurality of normal eyes). The comparison result may be information indicating the degree of a discrepancy between the actual measurement value and the normal eye data. The comparison result may be expressed as any of, for example, a difference, a rate, and a deviation. Moreover, the layer thickness information may be information indicating the thickness of one (for example, the nerve fiber layer) of the plurality of layers forming the retina, or may be information indicating any of the total, average, and statistic of the thicknesses of some layers.

The CPU 71 analyzes the three-dimensional OCT data to generate and acquire an analysis map related to the layer thickness. The analysis map related to the layer thickness represents two-dimensional distribution of layer thickness information of at least any of the layers of the retina.

For convenience's sake, in the following description, the analysis map related to the layer thickness is referred to as the "layer thickness analysis map."

The layer thickness analysis map may be a thickness map indicating the layer thickness, a comparison map indicating a comparison result of the layer thickness of the examinee's eye and the layer thickness of the normal eye, a deviation map that expresses a discrepancy between the layer thickness of the examinee's eye and the layer thickness of the normal eye as a standard deviation, or a difference map indicating a difference in thickness between examination dates. Note that the layer thickness of the normal eye (hereinafter referred to as the normal eye data) is prestored in a normal eye database.

In the following description, unless otherwise specified, a layer thickness analysis map is handled which indicates the distribution of the layer thickness in the retinal surface layer (including at least the nerve fiber layer (NFL) and the ganglion cell layer (GCL)), the distribution being related to a comparison result between examinee's eye data and the normal eye data.

<Blood Vessel-related Analysis Process>

Moreover, for example, the CPU 71 may perform a blood vessel-related analysis on the MC data to acquire blood vessel-related analysis information. Unless otherwise specified, the blood vessel-related analysis information in the example is assumed to be vessel density information. The vessel density information is an example of measurement data obtained by targeting blood vessels for measurement. The vessel density information may be the percentage of blood vessels occupied per unit region (volume or area) (the volume ratio or area ratio). The blood vessel-related analysis information is not necessarily limited to the vessel density information, and may be information representing another measurement result such as information related to the dimension of a blood vessel or information related to a blood flow velocity.

A result of the blood vessel-related analysis may be an analysis result of one of the plurality of layers forming the retina, or may be an analysis result obtained by analyzing some layers together.

The CPU 71 analyzes the three-dimensional MC data to generate and acquire a blood vessel-related analysis map. The blood vessel-related analysis map represents two-dimensional distribution of blood vessel-related analysis information of at least any of the layers of the retina.

For convenience's sake, in the following description, the blood vessel-related analysis map is referred to as the "blood vessel analysis map."

In the example, the blood vessel analysis map represents two-dimensional distribution of vessel density in the retinal surface layer. Specifically, the two-dimensional distribution may be a density map indicating vessel density, or may be a difference map indicating a difference in density between examination dates, or may be others. In other words, the blood vessel analysis map as the first isoline map may represent vessel density distribution data as the first distribution data, and pixels in closed sections enclosed by isolines may be filled with the colors or density levels in accordance with the vessel densities in the blood vessel analysis map.

As illustrated in FIG. 5, each of the analysis maps may be represented as an isoline map. In the isoline map, values of measurement data are divided into stages on the basis of some thresholds. Lines connecting the measurement data, the lines corresponding to the thresholds, are represented as isolines.

Filling pixels in closed sections enclosed by isolines with the colors or density levels in accordance with measurement data, or rendering an isoline map mainly with lines indicating thresholds (that is, rendering an isoline map in a wireframe representation) without the fills, is known as the representation form of the isoline map. The maps may be represented in the same form between a case where only the layer thickness analysis map is displayed and a case where only the blood vessel analysis map is displayed.

However, it is preferable that the color codes of the maps be different from one another. As an example, in the layer thickness analysis map of the example, regions on the map are color-coded using light green, yellow, and red sequentially in the ascending order of differences from the normal eye data. Moreover, in terms of the blood vessel analysis map, regions on the map are color-coded using red, yellow, light green, and blue sequentially in the descending order of vessel densities.

<Creation of Superimposed Map>

Moreover, the CPU 71 generates s superimposed map on the basis of two kinds of analysis maps: the layer thickness analysis map and the blood vessel analysis map. In other words, the CPU 71 generates a superimposed map of the retinal surface layer as the superimposed map, on the basis of the first distribution data and the second distribution data. In the superimposed map, the layer thickness analysis map and the blood vessel analysis map, which are related to the retinal surface layer, are superimposed. Note that the maps are aligned as appropriate, for example, on the basis of information of each of the maps, the information indicating a measurement position on the fundus. The information indicating the measurement position may be, for example, position information related to a fixation position during measurement, or position information relative to a certain fundus front image.

In the superimposed map illustrated in FIG. 5, the blood vessel analysis map is represented as a color map in which pixels in closed sections enclosed by isolines are filled. On the other hand, in the superimposed map, the layer thickness analysis map is represented as a wireframe color map. As an example, the color map shown in a wireframe representation may be generated by thinning the color map in which the pixels in the closed sections enclosed by the isolines are filled on the basis of the thresholds. In the example, a wireframe representation is applied to the entire layer thickness analysis map. The color map shown in a wireframe representation is represented by color-coding the thinned isolines in accordance with the values of the measurement data (the layer thicknesses here). In the superimposed map illustrated in FIG. 5, the layer thickness analysis map is placed in a higher layer than the blood vessel analysis map. The layer thickness analysis map placed in the higher layer is shown in a wireframe representation. Therefore, even if the color maps are superimposed on each other, the visibility of each map is unlikely to be damaged. As a result, it is easy to check the vessel density and layer thickness of the retinal surface layer against each other in each region. Consequently, it is possible to presume, for example, the occurrence of a functional disorder at a location where the layer thickness of the retinal surface layer has been reduced and a circulatory disorder is occurring. Therefore, it is possible to check the state of glaucoma progression. Moreover, there is a possibility that the progression of glaucoma can be grasped, and furthermore, the progression of glaucoma can be predicted, from, for example, the distribution of locations where the layer thickness has been reduced and a circulatory disorder is occurring.

<Superimposition of Measurement Result of Campimeter>

Moreover, the OCT analysis apparatus 1 can further acquire a measurement result of the examinee's eye with a campimeter separately as the third distribution data. As illustrated in FIG. 5, the CPU 71 can further merge the measurement result of the campimeter with the superimposed map.

Second Embodiment

Next, the second embodiment is described with reference to FIG. 6. A configuration and processes similar to those of the above-mentioned ophthalmic apparatus can be adopted for at least part of the configuration and processes of, for example, the ophthalmic apparatus of the second embodiment. Therefore, the description of points where the configuration and processes similar to those of the above-mentioned embodiment can be adopted are omitted or simplified below.

In the second embodiment, the CPU 71 of the OCT analysis apparatus 1 executes an analysis process, a three-dimensional representation map acquisition process, an MC data analysis process, a blood vessel map analysis process, and a superimposition process.

In the analysis process, the CPU 71 executes an analysis of the layer thickness on OCT data as described above. As a result, layer thickness distribution data (a "layer thickness map" in the second embodiment) indicating two-dimensional distribution of layer thickness information related to the fundus tissue is acquired. The layer thickness map of the embodiment is a map indicating a comparison result between an actual measurement value of the layer thickness obtained by the analysis for the OCT data and normal eye data (a statistic of the layer thickness from a plurality of normal eyes). In other words, the layer thickness map as the second isoline map may be a map shown in a wireframe representation of data of the distribution of the comparison results between a value of the layer thickness of known normal eye data and an actual measurement value of the layer thickness of the examinee's eye (comparison results related to the layer thickness) as the second distribution data. Specifically, in the embodiment, a map representing the distribution of the degrees of the discrepancy between the actual measurement value and the normal eye data is acquired for the layer thickness of the ganglion cell complex (GCC). In the example illustrated in FIG. 6, regions are colored in red, yellow, and green in the descending order of the degrees of the discrepancy from the normal eye data.

In the three-dimensional representation map acquisition process, the CPU 71 provides shading on the basis of the layer thickness distribution data to generate a three-dimensional representation map in which a three-dimensional effect is added to the two-dimensional distribution of the layer thickness information. Specifically, the CPU 71 renders the shade (lightness in the embodiment) of a region, among regions in the layer thickness distribution data (layer thickness map), in which the value of the layer thickness distribution data (the degrees of the discrepancy between the actual measurement value and the normal eye data in the embodiment) decreases progressively in a predetermined one-dimensional reference direction (in a one-dimensional direction from the bottom left toward the top right in FIG. 6 in the example illustrated in FIG. 6), darker (lower in lightness in this example) than the shade of a region in which the value of the layer thickness distribution data increases progressively in the same reference direction. Consequently, the three-dimensional representation map is generated. Note that it is needless to say that the CPU 71 can set the reference direction as appropriate. Moreover, the CPU 71 may provide shading by adjusting pixel values without adjusting lightness as described above.

As illustrated in FIG. 6, it is easier to grasp a change in the value of the layer thickness distribution data due to the three-dimensional effect on the three-dimensional representation map than on the layer thickness map in which at least only one of the color or density level changes according to the value of the layer thickness distribution data. In the embodiment, the degree of the discrepancy from the normal eye data is intuitive to grasp due to the three-dimensional effect.

In the embodiment, the CPU 71 adds a three-dimensional effect to the layer thickness distribution data by making a high lightness (the lightness of a shade) proportional to the amount of increase in the value of the layer thickness distribution data per unit distance (that is, the value increase rate) in the reference direction. Therefore, the three-dimensional effect of the three-dimensional representation map is more recognizable. Moreover, in the embodiment, a three-dimensional effect based on shading is further added to the layer thickness map being an isoline map. Therefore, it is easier for a user to grasp the distribution of the layer thickness information more intuitively due to both of the three-dimensional effect based on shading and the isolines. Furthermore, in the three-dimensional representation map of the embodiment, the pixels in the closed sections enclosed by the isolines are filled with the colors or density levels in accordance with the values of the layer thickness distribution data. Hence, it is easier for the user to grasp the distribution of the layer thickness information more intuitively due to the three-dimensional effect based on shading, the isolines, and the colors or density levels (the colors of red, yellow, and green in the embodiment) added respectively to the plurality of the closed sections.

In the MC data analysis process and the blood vessel map acquisition process, the CPU 71 executes the blood vessel-related analysis process on the above-mentioned MC data. Furthermore, the blood vessel distribution data (blood vessel maps in the example of FIG. 6) that indicates the two-dimensional distribution of the blood vessel information of a region of the fundus tissue, the region overlapping with that of the layer thickness distribution data, is acquired. In the example of FIG. 6, two blood vessel maps are acquired. A first blood vessel map on the left is a two-dimensional image based on OCT-Angiography, and can be obtained from MC data on layers from an upper slab located in the middle of the depth direction of the ganglion cell layer (GCL) to a lower slab located in the middle in the depth direction of the inner plexiform layer (IPL). Moreover, a second blood vessel map on the right in FIG. 6 is a two-dimensional image based on OCT-Angiography, and can be obtained from MC data on layers from the inner limiting membrane (ILM) to a lower slab located in the middle in the depth direction of the GCL.

In the superimposition process, at least one of the blood vessel map or the visual sensitivity map is superimposed and displayed on the three-dimensional representation map. In the example illustrated in FIG. 6, the color fundus image, the three-dimensional representation map, the second blood vessel map, the first blood vessel map, and the visual sensitivity map are superimposed sequentially from the bottom layer, in an aligned state. As described above, the visual sensitivity map indicates the two-dimensional distribution of the measurement result (visual sensitivity) of the examinee's eye with a static campimeter. Note that in terms of the visual sensitivity map illustrated in FIG. 6, two-dimensional distribution of the positions of ganglion cells corresponding respectively to a plurality of stimulation positions in a visual field examination is used as the visual sensitivity map on the basis of a model that determines the direction and distance of a displacement between the position of the photoreceptor cell and the position of the ganglion cell corresponding to the photoreceptor cell (that is, to which a signal from the photoreceptor cell is transmitted) (the known Drasdo model in the embodiment). Hence, the user can easily grasp the position of the ganglion cell corresponding to the stimulation position in at least one of the three-dimensional representation map or the blood vessel map.

<Modifications>

Up to this point descriptions have been given on the basis of the embodiments and the example. However, the technology of the present disclosure is not necessarily limited to the embodiments and the example, and can be modified in various manners.

For example, FIG. 5 illustrates the layer thickness analysis map in a wireframe representation in its entirety as the example. However, the representation is not necessarily limited to the above. The wireframe representation may be partially applied.

For example, in FIG. 7, a region in which thinning has progressed most (a region colored in "red") in grading of a layer thickness analysis map is shown in a wireframe representation, whereas the remaining region is represented by filling pixels in closed sections enclosed by isolines. As a use case of the layer thickness analysis map, the examiner focuses particularly on the region in which the retina has been thinned in many cases. Hence, it makes it possible to efficiently check a region that easily attracts attention of the examiner by enabling the region alone to be seen through a vessel density map.

Moreover, in FIG. 8, thinned regions (the regions colored in "red" and "yellow") in normal eye data in grading of a layer thickness analysis map are shown in a wireframe representation, whereas a normal layer thickness region is hidden. A region having a low vessel density may exist also in a normal layer thickness region. Also in such a case, there is a possibility that this region is an abnormal location other than glaucoma. In such a representation form as in FIG. 8, it is easy for the user to suitably check the abnormal location in such a case.

In a distribution map in a higher layer shown in a wireframe representation (the layer thickness analysis map in the example), what section (a section in measurement data divided on the basis of a threshold) is shown in a wireframe representation may be able to be switched as appropriate on the basis of an operation inputted by an examiner.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An ophthalmic apparatus comprising at least one processor, wherein the processor:

acquires first distribution data representing two-dimensional distribution of first measurement data of tissue of an examinee's eye;

acquires second distribution data representing two-dimensional distribution of second measurement data having a measurement target that is different from that of the first measurement data in the tissue of the examinee's eye, the two-dimensional distribution being related to a region overlapping with that of the first distribution data;

generates a first isoline map in which pixels in a closed section enclosed by an isoline is filled with a color or density level in accordance with a value of the first measurement data, the first isoline map representing the first distribution data;

generates a wireframe second isoline map in which a closed section enclosed by one or more isolines is not filled, the second isoline map representing the second distribution data;

generates a superimposed map by superimposing the first isoline map and the second isoline map;

determines which closed sections of the wireframe second isoline map to represent in wireframe format based on whether values of the second measurement data of respective closed sections meet predetermined threshold criteria corresponding to degrees of deviation from predetermined eye data; and represents closed sections having the values of second measurement data that meet the predetermined threshold criteria in wireframe format while representing remaining closed sections as filled with pixels.

2. The ophthalmic apparatus according to claim 1, wherein the first distribution data and the second distribution data represent distribution of measurement data in a two-dimensional region as a fundus is viewed from the front, and one of the first distribution data or the second distribution data represents two-dimensional distribution of blood vessel information in fundus tissue of the examinee's eye, and the other represents two-dimensional distribution of layer thickness information related to the fundus tissue.

3. The ophthalmic apparatus according to claim 2, wherein the blood vessel information is vessel density, and the layer thickness information is a comparison result between a value of a layer thickness of the predetermined eye data and an actual measurement value of a layer thickness of the examinee's eye.

4. The ophthalmic apparatus according to claim 3, wherein the first isoline map represents vessel density distribution data as the first distribution data, and pixels in a closed section enclosed by an isoline are filled with a color or density level in accordance with the vessel density in the first isoline map, and the second isoline map is a map in a wireframe representation of data of distribution of the comparison results related to the layer thickness as the second distribution data.

5. The ophthalmic apparatus according to claim 2, wherein the first distribution data and the second distribution data include at least information on a retinal surface layer, and the processor generates the superimposed map of the retinal surface layer as the superimposed map, on the basis of the first distribution data and the second distribution data.

6. The ophthalmic apparatus according to claim 2, wherein the processor further acquires third distribution data being measurement data of the examinee's eye with a static campimeter, the third distribution data representing two-dimensional distribution of visual sensitivities on the fundus, and upon generating the superimposed map, generates a second superimposed map by further superimposing a visual sensitivity map based on the third distribution data on the superimposed map.

7. A non-transitory, computer-readable, and tangible storage medium storing an ophthalmic information processing program to cause at least one processor of an ophthalmic apparatus to execute:

acquiring first distribution data representing two-dimensional distribution of first measurement data of tissue of an examinee's eye;

acquiring second distribution data representing two-dimensional distribution of second measurement data having a measurement target that is different from that of the first measurement data in the tissue of the examinee's eye, the two-dimensional distribution being related to a region overlapping with that of the first distribution data;

generating a first isoline map in which pixels in a closed section enclosed by an isoline is filled with a color or density level in accordance with a value of the first measurement data, the first isoline map representing the first distribution data;

generating a wireframe second isoline map in which a closed section enclosed by one or more isolines is not filled, the second isoline map representing the second distribution data;

generating a superimposed map by superimposing the first isoline map and the second isoline map;

determining which closed sections of the wireframe second isoline map to represent in wireframe format based on whether values of the second measurement data of respective closed sections meet predetermined threshold criteria corresponding to degrees of deviation from predetermined eye data; and representing closed sections having the values of second measurement data that meet the predetermined threshold criteria in wireframe format while representing remaining closed sections as filled with pixels.

8. An ophthalmic apparatus comprising at least one processor, wherein the processor:

acquires first distribution data representing two-dimensional distribution of sensitivity data of an examinee's eye using a static campimeter;

acquires second distribution data representing two-dimensional distribution of second measurement data having a measurement target that is different from that of the sensitivity data in tissue of the examinee's eye, the two-dimensional distribution being related to a region overlapping with that of the first distribution data;

generates a visual sensitivity map based on the first distribution data;

generates a wireframe second isoline map in which a closed section enclosed by one or more isolines is not filled, the wireframe second isoline map being based on the second distribution data;

generates a superimposed map by superimposing the visual sensitivity map and the wireframe second isoline map;

determines which closed sections of the wireframe second isoline map to represent in wireframe format based on whether values of the second measurement data of respective closed sections meet predetermined threshold criteria corresponding to degrees of deviation from predetermined eye data; and represents closed sections having the values of second measurement data that meet the predetermined threshold criteria in wireframe format while representing remaining closed sections as filled with pixels.

9. The ophthalmic apparatus of claim 1, wherein the wireframe second isoline map comprises a hybrid visualization having both the wireframe sections and the pixel-filled sections displayed simultaneously in a single map view.

10. The ophthalmic apparatus of claim 1, wherein the closed sections represented in wireframe format enable visibility of corresponding portions of the first isoline map through the wireframe sections, while the closed sections represented as filled with pixels obscure corresponding portions of the first isoline map.

* * * * *